United States Patent [19]

Davidson

[11] 4,294,038

[45] Oct. 13, 1981

[54] SOLAR PANEL WINDOW UNIT

[76] Inventor: James D. Davidson, 67 Grantour Ct., Pontiac, Mich. 48055

[21] Appl. No.: 39,448

[22] Filed: May 16, 1979

Related U.S. Application Data

[63] Continuation of Ser. No. 828,437, Aug. 29, 1977, abandoned.

[51] Int. Cl.³ .............................................. E05C 7/02
[52] U.S. Cl. ........................................ 49/63; 52/171; 237/1 R
[58] Field of Search ..................... 49/63, 370; 52/171; 237/1 A; 126/422, 429, 431, 432

[56] References Cited

U.S. PATENT DOCUMENTS

| | | | |
|---|---|---|---|
| 1,612,249 | 12/1926 | Anderson | 49/370 |
| 2,637,265 | 5/1963 | Emmert | 49/61 X |
| 3,863,621 | 2/1975 | Schoenfelder | 237/1 A |
| 4,083,148 | 4/1978 | Saucier | 49/63 |

FOREIGN PATENT DOCUMENTS 833992  5/1960  United Kingdom ................... 49/63

*Primary Examiner*—Kenneth Downey

*Attorney, Agent, or Firm*—Blanchard, Flynn, Thiel, Boutell & Tanis

[57] ABSTRACT

A solar panel device for use in combination with a window unit including a window frame and glass panels mounted in the window frame. The device is comprised of a shutter unit having one or more sets of horizontally and parallel extending tracks which are vertically spaced a distance at least equal to the height dimension of the window unit. The tracks extend parallel to the plane of the glass panel and beyond at least one of the side edges of the window unit. A laminate insulative shield is mounted in the track for movement between positions at the side of the window unit and in front thereof to block off the entirety of the glass panel. The laminate insulative shield includes a frame movably supported on the track and has an imperforate surface layer and an insulation material layer mounted side-by-side in the frame. The imperforate surface provides a rigidifying support for the rather fragile insulation material. A seal structure is provided for effecting a seal around the periphery of the glass panel and between the window unit and the insulative shield. A passageway is provided into and out of a chamber defined between the glass panel and the shield to facilitate the flow of fluid through the chamber. A solar energy absorbing material is applied to the imperforate surface.

8 Claims, 9 Drawing Figures

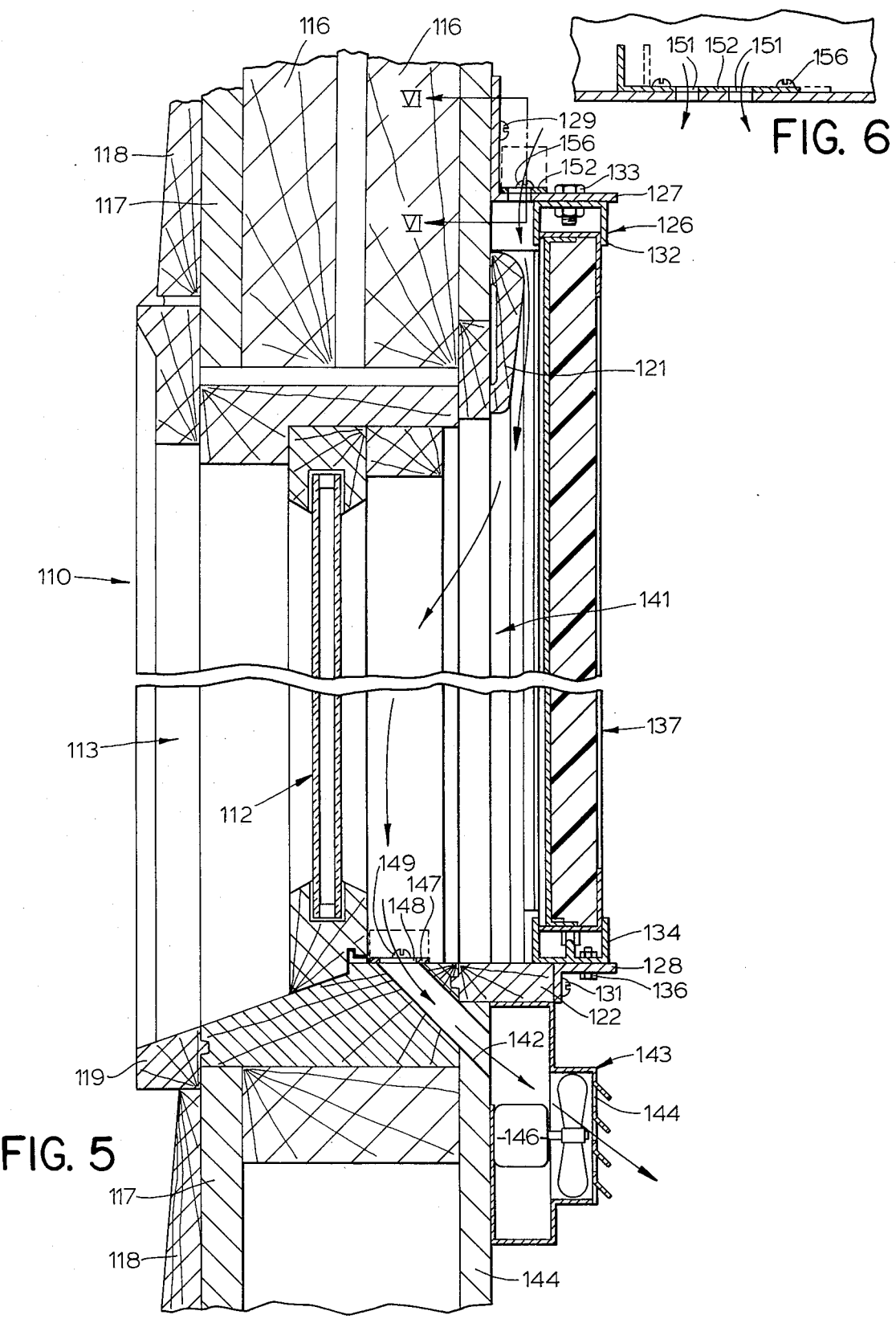

SOLAR PANEL WINDOW UNIT

CROSS REFERENCE TO RELATED APPLICATIONS

This is a continuation of application Ser. No. 828,437 filed Aug. 29, 1977, now abandoned.

See my copending application Ser. No. 776,488, filed Mar. 10, 1977, now abandoned.

FIELD OF THE INVENTION

This invention relates to a shutter unit for use in combination with a window unit and, more particularly, relates to a movable insulative shield for closing off a space exposed to the sun to form a solar energy generating device usable to provide heat to a house.

BACKGROUND OF THE INVENTION

Shutter units of many kinds and constructions are known in the art. One example of such shutter constructions are disclosed in Boyden & Warren U.S. Pat. No. 196,186. In addition, there is also known an interior type of shutter construction as illustrated in Shellman, Sr. et al. U.S. Pat. No. 3,491,675. Another device is disclosed in my copending application Ser. No. 776,488, filed Mar. 10, 1977, now abandoned. While these devices do disclose the use of solid panels to bar inclement weather, these devices are not effective for generating heat energy utilizable for heating purposes.

Accordingly, it is an object of this invention to provide a shutter unit for use in combination with a window unit, which shutter unit has the capability of minimizing heat transfer therethrough while simultaneously offering a rather substantial barrier against unauthorized entry and providing a source of heat generation.

It is a further object of this invention to provide a shutter unit which is capable of preassembly at the factory for installation into the building during construction and/or after the building has been completed to convert the normal window unit into a solar energy unit utilizable as a heat source to convert the sun's energy into a heating medium.

It is a further object of this invention to provide a shutter unit which is appealing in appearance when in the closed positio in front of the window unit and is durable in construction and maintenance free.

SUMMARY OF THE INVENTION

In general, the objects and purposes of the invention are met by providing a shutter unit which has one or more sets of horizontally and parallel extending tracks vertically spaced a height equal to the vertical height dimension of a window unit. The tracks extend parallel to the plane of the glass panel and beyond at least one side edge thereof. A laminate insulative shield is mounted in the track for movement between positions at the side of the window unit and in front thereof to block off the entirety of the glass panel means. The laminated insulative shield includes a frame movably supported on the track and has an imperforate surface layer and an insulation layer mounted side-by-side in the frame. A seal is provided for effecting a seal around the periphery of the glass panel means and betwen the window unit and the insulative shield. A solar energy absorbing substance is applied to the externally facing surface of the imperforate surface layer. The space between the imperforate surface layer and the glass becomes a heating chamber. A fan is provided for blowing the heated air in the chamber into the adjacent room.

BRIEF DESCRIPTION OF THE DRAWINGS

Further objects and purposes of this invention will be apparent to persons acquainted with apparatus of this general type upon reading the following specification and inspecting the accompanying drawings, in which:

In the drawings:

FIG. 5 is a sectional view taken along the line V—V in FIG. 4;

FIG. 6 is a sectional view taken along the line VI-VI in FIG. 5; and

DETAILED DESCRIPTION

Figure 1:
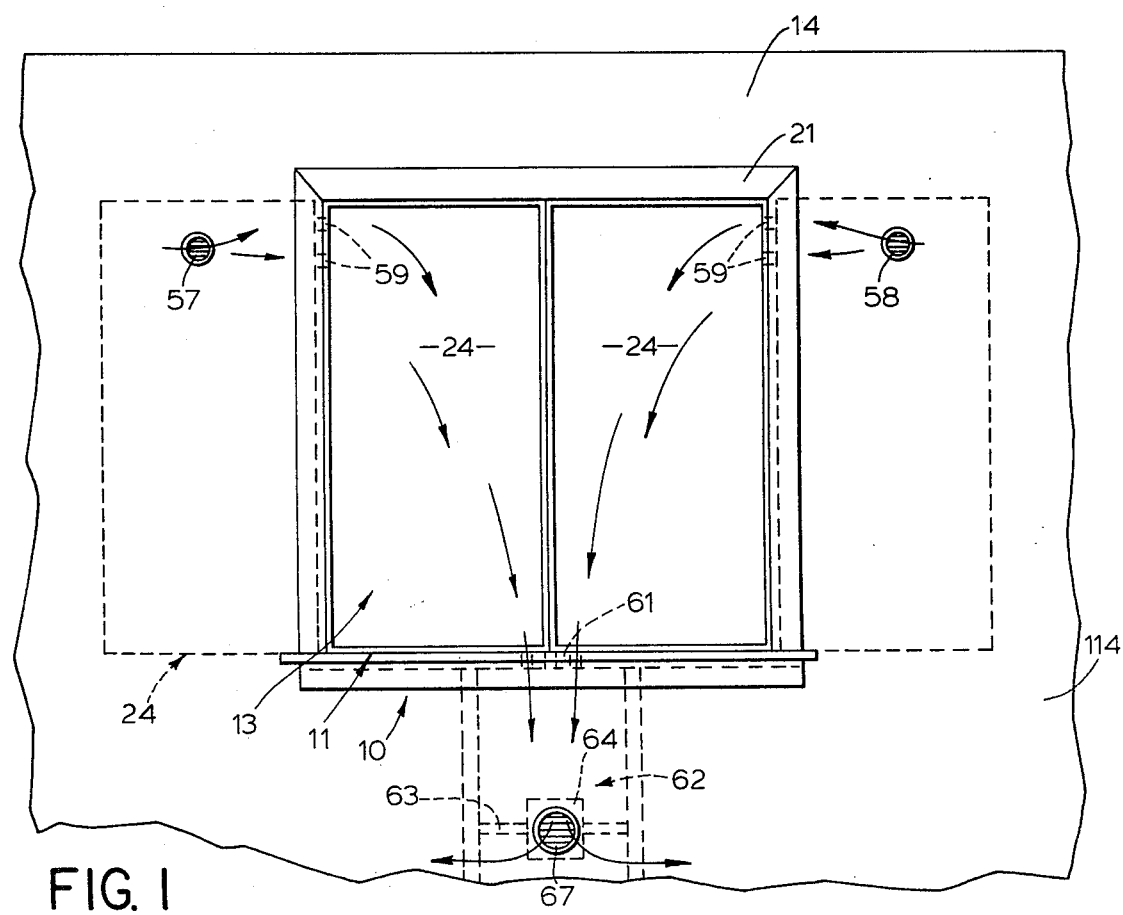
FIG. 1 is a front elevational view of a window unit having a shutter unit embodying the invention associated therewith.
Figure 2:
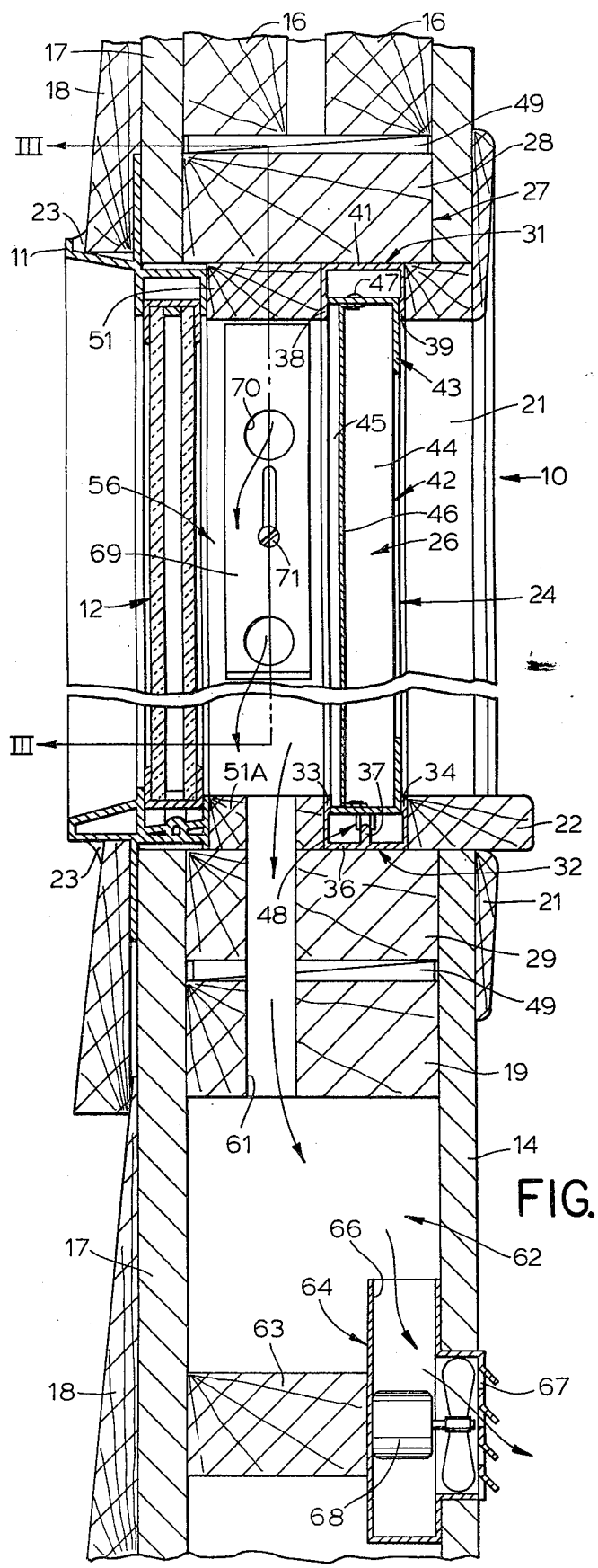
FIG. 2 is a central sectional view through the shutter unit in a window opening wherein the shutter unit has a single track associated therewith.

A window unit 10 is illustrated in FIG. 1 and comprises a conventional window frame 11 having one or a plurality of glass panels 12 either fixed or movable relative with respect to one another mounted therein. The window frame 11 is mounted in a window opening 13 in the wall 14 of a building. The wall 14 of the building has the usual header beams 16 over the top of the window opening 13. The external surface of the building has the usual sheathing 17 and outside siding 18. The wall 14 also has the usual frame sill 19 and decorative trim structure 21 and stool 22 around the inside of the window opening 13. In addition, caulking 23 is provided between the window frame 11 and outside siding 18 as illustrated in FIG. 2. It is to be understood that the window unit 10 illustrated in the drawings is for illustrative purposes only and no invention resides in the specific structure thereof.

My invention resides in the provision of a shutter unit 24 which is mounted in close proximity and encircling relation with respect to the window unit 10 and disclosed in detail in my copending application Ser. No. 776,488, filed Mar. 10, 1977. The shutter unit 24 has one or more insulative shield units 26 mounted on a track frame 27. The number of insulative shield units is controlled by the width of the window unit 10. More specifically, the track frame 27 (FIG. 2) is composed of an upper frame member 28 and a lower frame member 29 vertically spaced from the upper frame member 28, which vertical spacing is maintained by a pair of not shown end frame members secured to the remote ends of the upper and lower frame members 28 and 29. The length of the track frame 27 is longer than the width of the window unit to provide storage for panels discussed below at one or more sides of the glass panel 12. The inside to outside spacing and the section of the track frame 27 at one or both sides of the opening defined by the upper and lower frame members 28 and 29 and not illustrated intermediate frame members define pockets.

Details of this structure are discussed in my aforementioned copending application.

The track frame 27 includes a first set of tracks consisting of an upper track 31 and a lower track 32. A single track shutter unit 24 is illustrated in FIG. 2. The lower track 38 has a pair of parallel upstanding side walls 33 and 34 (FIG. 2) thereon with a bright portion 36 interconnecting said side walls along the bottom edge thereof. An upwardly projecting rail 37 is centrally disposed on the bight portion 36. The upper track 31 has a pair of parallel side walls 38 and 39 with an interconnecting bight portion 41.

The insulative shield unit 26 includes at least one insulated panel 42 mounted on the pair of tracks 31 and 32. In the embodiment illustrated in FIG. 2, a pair of insulated panels 42 are provided. Each insulated panel 42 consists of an annular rectangular frame 43. A sheet of insulation material 44 is disposed in the frame 43 and an imperforate sheet or metal panel 6 is placed thereover and riveted to a leg of the frame 43 by a plurality of rivets 47 so as to fixedly secure the insulation material in the frame 43. The insulation material 44 is preferably a polyurethane composition which is rather fragile when forces perpendicular to the plane thereof are applied thereto. However, the imperforate sheet or metal panel 46 serves to rigidly back the insulation material 44 while simultaneously functioning as a barrier to prevent unauthorized movement through the window opening when the insulated panels 42 are in the closed position.

The lower edge of the frame 43 of each insulated panel 42 has an opening therethrough and a roller assembly 48 is mounted in the opening. The rollers are adapted to engage the rail 37 in the lower track 32.

The horizontal width of the frame 43 has a length which corresponds to the horizontal spacing between the legs 38 and 39 of the upper track 31 and the legs 33 and 34 of the lower track 32. As a result, and in view of the occupancy of the entire width of the tracks 31 and 32 by the frame 43, an effective sliding seal is provided thereat. The flange 45 defines the seal along the vertical edge of the insulative panel 42 so that an effective seal is provided around the periphery of the glass panel 12 and between the window unit and the insulative shield 42.

During assembly of the track frame 27 into the wall of a building under construction, the track frame 27 is mounted on the frame sill 19 so that the track frame 27 is positioned between the frame sill 19 and the header beams 16. If desired, shims 49 can be utilized to properly locate the track frame relative to the window opening 13, particularly the window frame mounted therein. In addition, and if desired, a trim strip 51 can be provided between the upper and lower tracks 31 and 32, respectively, and the inside portion of the window frame 11. The trim 21 on the inwardly facing side of the track frame 27 can also be selected to correspond to the thickness of the inside wall 14 between the track frame 27 and the other inner trim 21 encircling the window opening.

Referring in more detail to the characteristics of the insulation material 44, it is presently contemplated to utilize sheets of polyurethane as stated above. The sheets of polyurethane are preferably in the range of one-half inch to one inch thick and have an insulation "R" factor in the range of between 3 and 8. When only one panel exists for blocking the entirety of the glass panel, the panel 44 will be sealed at the tracks 31 and 32 as well as at the lateral edges as a result of an abutment of the one edge of the panel with one side wall of the window opening and with a flange on the frame 43 coming into contact with a stop provided on the other side edge of the window opening.

The tracks 31 and 32 can extend beyond the laterally opposite edges of the window unit into a pair of pockets on opposite sides of the window. In this construction, the number of panels can be divided so that one-half will be received into one pocket for storage and the other half will be received into the other pocket for storage.

The spacing between the window glass 12 and the insulative panel 42, particularly the panel 46 thereof defines a chamber 56 therebetween. The side of the panel 46 facing externally is coated with a solar energy absorbing material, such as a black paint. A pair of openings 57 and 58 are cut into the wall 14 (FIG. 1) and communicate with the pockets located at the sides of the window opening 13. A plurality of openings 59 are provided in the trim pieces 51 to define passageways extending between the pockets and the chamber 56. Referring to FIG. 2, a hole 61 is drilled into the bottom trim piece 51A and the lower frame member 29 and frame sill 19. A second chamber 62 is defined between a pair of studs and a cross piece 63. The hole 61 provides communication between the chambers 56 and 62. A housing structure 64 is mounted to the cross piece 63 and has an inlet 66 and an outlet 67. A blower motor 68 is mounted in the housing structure 64 and the output shaft thereof has a fan blade assembly fastened thereto and rotatable therewith. As a result, an electrical energization of the motor 68 will cause heated air to be drawn out of the chamber 56 and into the chamber 62 and thence through the housing structure 64 and outlet 67 thereof. Replacement air will be drawn into the chamber 56 through the openings 57, 58 and 59. If desired, the chamber 62 can be appropriately insulated to lower the heat loss as much as possible. In additiona, a thermocouple can be utilized to control the motor 68 in relationship to the temperature of the air being moved thereby.

A valve plate 69 is slidably mounted on the trim piece 51 to regulate the air flow into the chamber 56. The valve plate 68 has holes 70 therein alignable with the holes 59 in the trim piece 51. A scew 71 is utilized to lock the valve plate 68 in a fixed position on the trim piece 51 and relative to the openings.

If no motor is to be utilized, air will flow in reverse, namely into the outlet 67, thence through the chambers 62 and 56 and out through the openings 57, 58 and 59. Thus, it is important that the openings 57, 58 and 59 be located near the top of the window opening to maximize the efficiency of the solar energy conversion.

Figure 7:
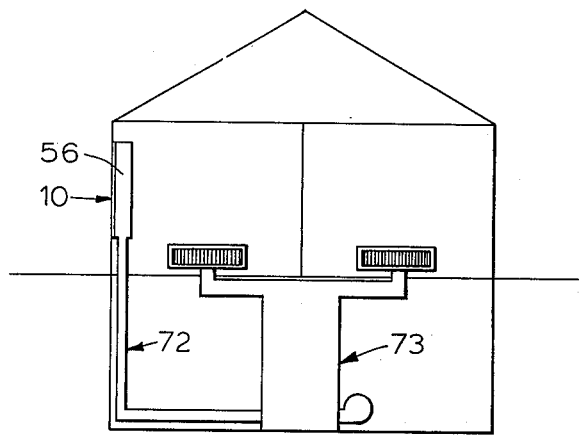
FIGS. 7 to 9 illustrate other conventional type applications for the invention disclosed herein to assist the central heating system for a building.
Figure 8:
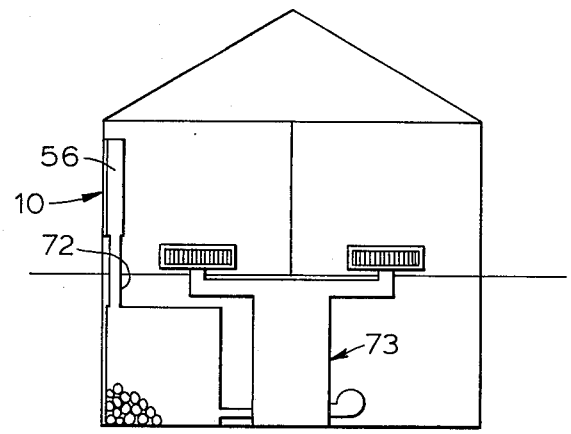
Figure 9:
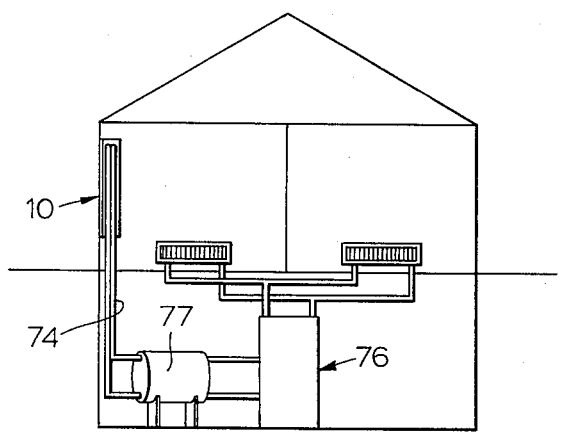

As shown in FIGS. 7 and 8, the heated air in the chamber 56 can be connected via duct work 72 to the central heating system 73 in a building. The heated air can also be used to heat stones and the like to facilitate a heat storage for use at a later time when direct sunlight may be unavailable. As shown in FIG. 9, liquid containing conduits 74 can also be utilized in the chamber 56 but instead of the utilizing a forced air heating system, a hot water system 76 is used and the hot water supply is augmented by the water heated in the chamber 56 and stored in a storage tank 77.

ALTERNATE CONSTRUCTIONS

When it is desired to utilize my invention in association with buildings that have already been constructed, it will not be conveniently possible to provide pockets for the insulated panels at the side edge of the window units. However, I have provided a modified construction for cooperation with window units such as is illustrated in FIGS. 5 and 6. In this particular embodiment, I have illustrated a slightly different window construction 110 having a window frame 111 with a glass panel 112 mounted in the window opening 113. The window frame 111 is mounted in the wall 114. Conventional header beams 116 are provided over the top of the window opening 113 and conventional sheathing 117 and outside siding 118 and trim 119 are provided in the usual manner. In addition, decorative trim 121 is provided on the inside of the building encircling the window opening and the window has the usual stool 122 provided thereon.

Figure 4:
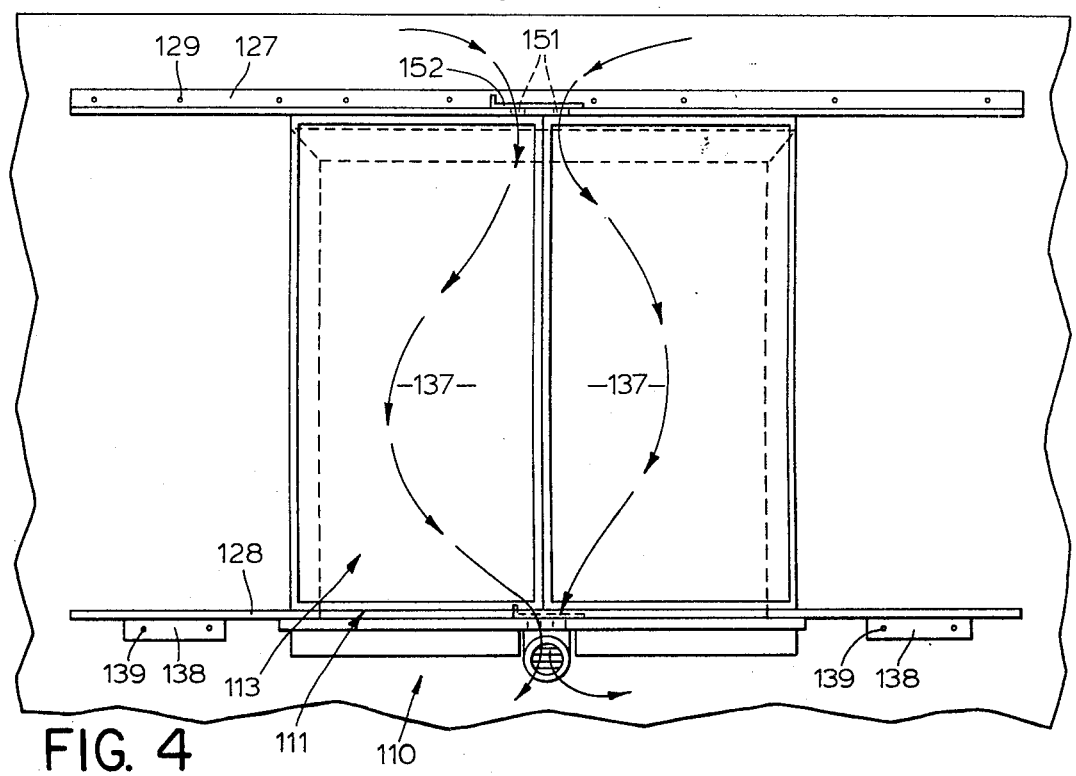
FIG. 4 is a front elevational view of a modified form of the invention.
Figure 3:
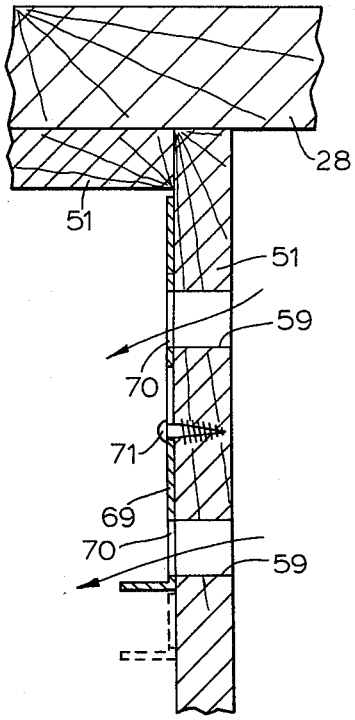
FIG. 3 is a sectional view taken along the line III—III of FIG. 2.

I have developed a modified track frame 126 which includes upper and lower brackets 127 and 128, respectively, the upper bracket being secured to the wall 114 by screws 129 and the lower bracket being secured to the inside edge, for example, of the stool 122 by screws 131. The bracket 127 includes an inverted U-shaped trough 132 secured by a bolt assembly 133 to the bracket 127. Similarly, a lower U-shaped trough 134 is secured by a bolt assembly 136 to the bracket 128. The troughs 132 and 134 define the upper and lower sets of tracks. In addition, insulated panels 137 identical to the insulated panels 42 are slidably disposed in the tracks in a manner which has been described hereinabove and in association with the embodiment illustrated in FIGS. 1 to 3. Accordingly, it is believed that based upon the preceding discussion that the cooperation between the insulated panels and the tracks will be appreciated. As with the preceding embodiment, the upper and lower sets of tracks extend laterally beyond the side edges of the window opening 113 as illustrated in FIG. 4. The lateral ends of the lower track each have a bracket 138 thereon which is secured to the wall 114 by screws 139.

The space between the glass panel 12 and the insulated panel 137 defines a chamber 141, similar to the chamber 56 described above. The lateral edges of the chamber 141 are sealed as are the upper and lower edges at the trough constructions 132 and 134.

A pair of holes 142 are drilled into the sill and communicate with the interior of a housing structure 143 fastened to the wall 114. The housing structure has an outlet 144 and houses a motor 146 therein which has a fan blade assembly fastened to the output shaft thereof.

A valve plate 147 is slidably mounted on the sill and has a pair of openings 148 therein alignable with the holes 142 to regulate the air flow out of the chamber 141. A screw 149 is utilized to fix the valve plate 147 in location.

The air supply openings for the chamber 141 are located at the top of the window unit 110, namely in the upper bracket 127 which has a pair of holes 151 therein, preferably in the center thereof. A valve plate 152 is slidably mounted on the sill and has a pair of openings 153 therein alignable with the holes 151 in the bracket 127 to regulate the air flow into the chamber 141. A pair of screws 156 are utilized to fix the valve plate 152 in location.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. For use in combination with a window unit in a wall of a building including a window frame and glass panel means mounted in said window frame, a shutter unit, comprising:

first and second parallel extending track means having a spacing therebetween at least equal to the height dimension of said window unit, said track means being located on the inside of said buidling relative to said window unit and extending parallel to the plane of said glass panel means;

laminate insulative shield means mounted in said track means for movement between positions at the side of said window unit and in front thereof, to block off the entirety of said glass panel means to the inside of said building, said laminate insulative shield means including a frame movably supported on said track means and having an outside facing imperforate heat absorptive surface layer facing said glass panel and an insulation material layer mounted on the inside facing portion of said heat absorptive surface layer remote from said glass panel in said frame, said insulative material having little resistance against breakage when forces are applied in directions perpendicular to the plane thereof, said imperforate surface providing a protective barrier from the outside and a rigidification of said insulative material against the effects caused by forces applied from the outside in directions perpendicular to the plane thereof;

seal means for effecting a seal around the periphery of said glass panel means and between said window unit and said insulative shield means to define a sealed chamber therebetween when said insulative shield means is in the blocking position; and openable and closeable passageway means into and out of said sealed chamber defined between said glass panel means and said laminate insulative shield means when in the blocking position to facilitate the flow of fluid through said chamber.

2. The shutter unit according to claim 1, wherein the outside facing portion of said imperforate heat absorptive surface layer is coated with a solar energy absorbing material.

3. The shutter unit according to claim 2, wherein said solar energy absorbing material is a black paint.

4. The shutter unit according to claim 1, wherein said passageway means is connected in circuit with the fluid supply to a central heating system of a house.

5. The shutter unit according to claim 4, wherein said fluid is air.

6. The shutter unit according to claim 4, wherein said passageway means are liquid containing conduits.

7. The shutter unit according to claim 4, wherein said fluid is air; and including blower means for forceably moving said air through said chamber.

8. The shutter unit according to claim 1, wherein said first and second track means extend horizontally and are vertically spaced, said tracks extending beyond at least one side edge of said window unit.

* * * * *

UNITED STATES PATENT AND TRADEMARK OFFICE
CERTIFICATE OF CORRECTION

PATENT NO. : 4,294,038
DATED : October 13, 1981
INVENTOR(S) : James D. Davidson

It is certified that error appears in the above—identified patent and that said Letters Patent is hereby corrected as shown below:

Column 1, line 24, "3,491,675" should read -- 3,496,675 --.

Column 1, line 45, "positio" should read -- position --.

Column 2, line 13, "the" should read -- a --.

Column 2, line 42, after "and" insert -- the --.

Column 2, line 64, "more" should read -- both --.

Column 3, line 7, "bright" should read -- bight --.

Column 3, line 19, "6" should read -- 46 --.

Column 4, line 41, "additiona" should read -- addition --.

Signed and Sealed this

Twenty-fifth Day of May 1982

[SEAL]

Attest:

Attesting Officer

GERALD J. MOSSINGHOFF
Commissioner of Patents and Trademarks